United States Patent [19]

Gruber

[11] 4,340,708

[45] Jul. 20, 1982

[54] ANAEROBICALLY HARDENING ADHESIVES AND SEALING COMPOUNDS

[75] Inventor: Werner Gruber, Düsseldorf, Fed. Rep. of Germany

[73] Assignee: Henkel Komanditgesellschaft auf Aktien, Düsseldorf-Holthausen, Fed. Rep. of Germany

[21] Appl. No.: 219,244

[22] Filed: Dec. 22, 1980

[30] Foreign Application Priority Data

Dec. 24, 1979 [DE] Fed. Rep. of Germany ....... 2952286

[51] Int. Cl.$^3$ ............................................. C08F 20/20
[52] U.S. Cl. .................................. 526/313; 526/204; 526/214; 526/215; 526/320; 526/323.1; 526/323.2
[58] Field of Search .................... 526/313, 320, 323.1, 526/323.2, 204, 214, 215

[56] References Cited

U.S. PATENT DOCUMENTS 3,525,726  8/1970  Galinke et al. ...................... 526/220
3,984,385  10/1976  Gruber et al. ................... 526/323.1

*Primary Examiner*—Harry Wong, Jr.
*Attorney, Agent, or Firm*—Hammond & Littell, Weissenberger and Muserlian

[57] ABSTRACT

The present invention is directed to anaerobically hardening adhesives, sealing compounds, and the like. More particularly, the present invention is directed to an anaerobically hardening adhesive and sealing composition comprising methacrylic or acrylic acid esters, organic peroxides, nitrogen containing compounds as accelerators for polymerization, and customary adjuvant substances, wherein a content of cyanoacetic acid or an ester or an amide thereof is also present.

11 Claims, No Drawings

ANAEROBICALLY HARDENING ADHESIVES AND SEALING COMPOUNDS

FIELD OF THE INVENTION

The present invention is directed to anaerobically hardening adhesives, sealing compounds, and the like. More particularly, the invention is directed to compositions which harden rapidly in the absence of oxygen, based upon the meth(acrylic)acid esters and organic hydroperoxides. They are preferably used in solvent-free form for the above-mentioned purposes.

BACKGROUND OF THE INVENTION

It is known that methacrylic acid esters or acrylic acid esters of various alcohols together with hydroperoxides yield mixtures which harden under exclusion of atmospheric oxygen and which can be used as adhesives and sealing compounds. These mixtures, or systems, contain as essential components monomeric or oligomeric (meth)acrylic acid esters of monohydric or polyhydric alcohols, as well as peroxide or hydroperoxide. Accelerators are added to the systems to obtain a sufficiently rigid hardening under exclusion of oxygen.

It is known to use certain sulfur and/or nitrogen-containing organic compounds as accelerators. With these compounds, a strength which permits handling of the cemented objects can be obtained in a relatively short time. Such strength is usually judged according to the so-called hand fastness test, wherein several drops of the anaerobically hardening compound are applied, for example, on the threads of a degreased screw, which is subsequently joined with the respective nut. From time to time the nut is turned slightly toward the screw, and the time is determined until the screw can no longer be turned by hand. This is used as the measure for the hand fastness.

Of greater importance, however, for the use of an anaerobically hardening adhesive or sealing compounds is the time required until the torque of 500 Ncm is necessary to loosen the cemented screw.

OBJECTS OF THE INVENTION

It is an object of the invention to provide novel compositions based upon (meth)acrylic acid esters and organic peroxides which harden rapidly in the absence of oxygen.

It is also an object of the invention to provide accelerators for anaerobically hardening systems based upon (meth)acrylic acid esters and organic peroxides which lead rapidly to a force-locking joint after parts to be joined have been assembled but which do not have an adverse effect on the stability of the hardening systems.

It is a further object of the invention to provide anaerobically hardening adhesive and sealing systems based upon (meth)acrylic acid esters and cyanoacetic acid or esters or amides of cyanoacetic acid.

These and other objects of the invention will become more apparent in the discussion below.

DETAILED DESCRIPTION OF THE INVENTION

According to the invention, the anaerobically hardening adhesive and sealing systems based upon (meth)acrylic acid esters contain cyanoacetic acid or esters or amides of cyanoacetic acid. Preferably cyanoacetic acid or the derivatives thereof are used in an amount of from about 0.01 to 10 percent by weight, especially preferably from about 0.1 to 5 percent by weight, based on the weight of the (meth)acrylic acid esters. A readily determinable criterion for the suitability of the derivatives of cyanoacetic acid is that they have a sufficient degree of solubility in the system and have no adverse effect on the stability of the anaerobic mixtures.

If an ester of cyanoacetic acid is used, the alcohol component of the ester should consist of an aromatic or aliphatic radical, which can also contain electronegative substituents, with from 1 to 20 carbon atoms. Suitable esters include, for example, methyl, butyl, or cyclohexylesters or decyl or hexadecyl esters, which can also be substituted by from 1 to 3 chlorine or bromine atoms. Suitable alcoholic ester components also include, for example, nitroethanol or the isomeric nitrobutenols. Suitable aromatic ester components include either phenol or $\alpha$- and $\beta$-naphthol, or o- or p-substituted derivatives, especially with a nitro or sulfonic acid group or with a halogen, particularly chlorine and/or bromine. More secific examples of suitable phenolic ester components are, therefore, p-nitrophenol, o-chloro-p-nitrophenol, o,p-dinitrophenol, and 2,4-dinitronaphthol as well as the 4- and 8-naphthol sulfonic acid, and the 6-, or 7-, or 8-naphthol $\beta$-sulfonic acid. Also, p-nitrobenzyl alcohol, or similarly constituted substances, can be used.

For the purposes of the invention, cyanoacetic acid amide itself is a typical, suitable representative. The amide group can also be substituted by an aliphatic radical which can also be interrupted by hetero-atoms and/or be closed to a ring over the amide nitrogen, and the aliphatic radical may have up to 18, preferably from 2 to 8, carbon atoms. The amide may be substituted with two such aliphatic radicals having up to 18 carbon atoms. Suitable cyanoacetic acid amides include, for example, cyanoacetic acid monomethylamide, dimethylamide, diethylamide, dibutylamide, cyclohexylamide, octylamide, morpholine, and pyrrolidine.

The cyanoacetic acid or its derivatives according to the invention can be used principally in all so-called anaerobically hardening adhesives and sealing compounds. Such systems are composed, for example, of (meth)acrylic acid esters of polyhydric alcohols, such as ethylene glycol, diethylene glycol, triethylene glycol, tetraethylene glycol, polyethylene glycol, glycerin, pentanediol, or di-, tri-, or tetrapropylene glycol, or the (meth)acrylic acid esters of isomeric di-(hydroxymethyl)-tricyclodecanes or their derivatives, which can be obtained by reaction of the di-(hydroxymethyl)tricyclododecane with dicarboxylic acid anhydrides in a molar ratio of 1:2 and a subsequent reaction of the free carboxyl groups with glycidyl methacrylate (see, U.S. Pat. No. 4,172,951, incorporated herein by reference.) Furthermore, (meth)acrylic acid esters of tetrahydrofuryl alcohol or cyclopentanol or cyclohexanol can be used. Another group of anaerobically hardening adhesives comprises the reaction products of glycidyl ethers of polyhydric phenols with acrylic acid or methacrylic acid.

Useful monomers also include the di(meth)acrylic acid esters of ethoxylated or propoxylated diphenylol propane, as well as the reaction products of bis-half-esters of the diols, such as butanediol, and others with glycidyl methacrylate corresponding to U.S. Pat. No. 4,096,323, incorporated herein by reference.

Another essential component of the anaerobically hardening systems is the peroxide initiators. These are primarily hydroperoxides which are derived from hydrocarbons with a chain length of from 3 to 18 carbon atoms. Suitable, for example, are cumene hydroperoxide, tert.butyl hydroperoxide, methylethyl-ketone-hydroperoxide, and diisopropyl-benzene-hydroperoxide. Suitable also are those peroxides which have a half life period of ten hours at a temperature of from about 80° to 140° C. These include tert.butyl perbenzoate, di-tert.butyldiperoxyphthalate, 2,5-dimethyl-2,5-bis-(tert.butylperoxy)-hexane, bis-(1-hydroxy-cyclohexyl)-peroxide, tert.butyl peroxyacetate, 2,5-dimethylhexyl 2,5-di-(peroxybenzoate), tert.butyl-valeroyl-peroxide, 2,2-bis-(tert.butylperoxy)-butane, and di-tert.butyl-peroxide.

The peroxides should be present in an amount of from about 0.1 to 20, particularly from about 1.0 to 10, percent by weight, based on the weight of the total mixture. They are mostly used as phlegmatized solutions or pastes, that is, with a relative low content of inert substances, such as dimethyl phthalate or cumene.

According to another, preferred embodiment of the present invention, an organic amine can be additionally used as an auxiliary accelerator together with the accelerators according to the invention. Such auxiliary accelerators include, for example, N,N-dimethyl-o-toluidine, N,N-dimethyl-o-toluidine, and tri-n-butylamine. They should only be used in small amounts of from 0.1 to a maximum of 1.5 percent by weight.

Finally, thickeners, plasticizers, inorganic fillers, and dyes can be added to the adhesives according to the invention. Suitable thickeners include polymeric compounds, such as polymethyl methacrylate, polyethyl acrylate, polystyrene, polyvinyl chloride, synthetic rubber, and the like. Suitable fillers include, for example, finely-divided silicon dioxide, silicates, bentonites, calcium carbonate, and titanium dioxide.

The adhesives and sealing compounds according to the invention can be stored safely for months in partly filled bottles of glass, polyethylene, etc. A relatively low oxygen partial pressure suffices to inhibit polymerization. It was found expedient here, as well as in other cases, to use colored bottles which prevent passage of short-wave light. The stability of the compounds is therefore favorably influenced. Stabilization can also be achieved in known manner by the addition of organic peracids, such as peracetic acid.

The anaerobically-hardening compositions of the present invention are used in the industry for cementing metal sheets or metal parts of different materials, as, e.g., for cementing of screws and bolts in their threads, for sealing of screw-connections, nipples, etc., the cementing of plug connections, the sealing of flanges, the assembly of intricate metal shapes, sealing pipe joints, etc. Assemblies of metals such as iron, brass, copper, and aluminum can be bonded to each other. Small quantities of the adhesive compositions are introduced between the surfaces to be bonded, after which the surfaces are contacted with each other sufficiently firmly or in another manner so as to exclude air or oxygen. Then the compositions of the invention polymerize rapidly forming a firm bond. It is naturally also possible to accelerate the hardening with known means, as, for example, by heating the joint.

When the adhesives of the present invention are to be used for adhering or sealing glass or plastics or metals which are less catalytically active (for example, zinc, cadmium, high-alloyed steels, and anodized aluminum), it is advantageous to pretreat these materials with metallic salt accelerators (for example copper naphthenate or cobalt naphthenate).

In the specification and claims the term "(meth)acrylate(s)" and "(meth)acrylic ester(s)" are used to designate esters of acrylic acid and esters of methacrylic acid. The esters of methacrylic acids are preferred. The esters are termed latent adhesives because they do not develop their adhesive properties until they have polymerized.

In general, so-called hand-fast joints are obtained after a few minutes already with the anaerobic adhesives according to the invention. It should be stressed that the time required to achieve real strength, which permits handling in practice, namely a torque of at least 500 Ncm for loosening screw joints, is between 10 and 30 minutes.

The invention is further described in the examples which follow. These examples are preferred embodiments of the invention and should not be construed as limiting the invention thereto.

EXAMPLES

Testing Methods

The anaerobically hardening compositions produced in the examples below were subjected to the following tests:

(A) Hand Fastness Test

In the hand fastness test, several drops of the anaerobically hardening compound are applied on the thread of a degreased brass screw (M 10×30 DIN 933), which is then joined with the respective unit. From time to time the nut is turned somewhat toward the screw to determine at what time the nut can no longer be turned by hand on the screw without a special effort. The time that has elapsed until then is considered a measure of the handfastness.

(B) Time Required to Achieve a Torque of at Least 500 Ncm

The fastness test is carried out on degreased iron screws (M 10×30 DIN 933-8.8) and nuts. After the screw provided with a few drops of adhesive has been assembled with the fitting screw, the torque that is necessary to loosen the adhesive bond is determined in intervals of a few minutes with a torque wrench. The measure of strength is considered to be the time required for a torque of 500 Ncm or more to be required to turn the nut.

(C) Strength After 60 minutes and 24 Hours

The torque required to loosen the bond was determined in Ncm, by means of a torque wrench, on cemented iron screws and nuts after storage for 60 minutes and 24 hours, respectively, at room temperature.

In addition, the compressive shearing strength was determined on cemented steel bolts and steel disks after hardening for 24 hours at room temperature according to DIN draft 54 542.

(D) Stability Test

In the stability test, a test tube of 10 cm length and 10 mm width was 9/10 filled with the mixtures of the examples and suspended in a bath kept at 80° C. The time from the suspension to the first gel formation was measured.

All of the above tests were repeated five times. The mean values of the five measurements are given in the examples which follow.

EXAMPLE 1

One gram of cyanoacetic acid, 1 gm of N,N-dimethyl-p-toluidine, 3 gm of cumene hydroperoxide (70% in cumene), and 1 gm of peracetic acid (40% in acetic acid) were added successively to 100 gm of triethylene glycol dimethacrylate containing 200 ppm of hydroquinone. This anaerobically hardening adhesive mixture showed stability at 80° C. of over 30 minutes. Cemented screws and nuts were handfast after 5 minutes. The following strength values were obtained:

| | | |
|---|---|---|
| Torque after 60 minutes: | 20 | Nm |
| Torque after 24 hours: | 58 | Nm |
| Compressive shearing strength after 24 hours: | 20 | Nm/mm$^2$ |

EXAMPLE 2

One gram of cyanoacetic acid, 0.5 gm of N,N-dimethyl-p-toluidine, 3 gm of cumene hydroperoxide (70% in cumene, and 0.5 gm of peracetic acid (40% in acetic acid) were added successively to a mixture of 50 gm of a dimethacrylate of the reaction product of bis-(dihydroxymethyltricyclo[5.2.1-O$^{2.6}$]-decane)maleate and glycidyl methacrylate, as well as 50 gm of triethylene glycol dimethacrylate. This anaerobically hardening adhesive mixture showed the following properties:

| | | |
|---|---|---|
| Stability at 80° C.: Hand-fast after 3 minutes. | >30 | minutes |
| 500 Ncm torque: | 25 | minutes |
| Torque after 60 minutes: | 15 | Nm |
| Torque after 24 hours: | 60 | Nm |
| Compressive shearing strength after 24 hours: | 25 | N/mm$^2$ |

EXAMPLE 3

Amounts of 0.5 gm of cyanoacetic acid, 0.25 gm of N,N-dimethyl-p-toluidine, and 3 gm of cumene hydroperoxide (70% in cumene) were added successively to a mixture of 50 gm of a dimethacrylate of propoxylated diphenylol propane and 50 gm of hydroxyethyl methacrylate. This anaerobically hardening adhesive mixture showed the following properties:

| | | |
|---|---|---|
| Stability at 80° C.: Hand-fast after 5 minutes. | >30 | minutes |
| 500 Ncm torque: | 15 | minutes |
| Torque after 60 minutes: | 20 | Nm |
| Torque after 24 hours: | 52 | Nm |
| Compressive shearing strength after 24 hours: | 21 | N/mm$^2$ |

EXAMPLE 4

One gram of cyanoacetic acid, 1 gm of N,N-dimethyl-p-toluidine, and 3 gm of cumene hydroperoxide (70% in cumene) were added successively to a mixture of 50 gm of a dimethacrylate of propoxylated diphenylol propane and 50 gm of hydroxyethylmethacrylate. This anaerobically hardening adhesive mixture showed the following properties:

| | | |
|---|---|---|
| Stability at 80° C.: Hand-fast after 10 minutes. | >30 | minutes |
| 500 Ncm torque | 30 | minutes |
| Torque after 24 hours: | 50 | Nm |
| Compressive shearing strength after 24 hours: | 18 | N/mm$^2$ |

EXAMPLE 5

Two grams of cyanoacetic acid diethylamide, 1 gm of N,N-dimethyl-p-toluidine, and 2 gm of cumene hydroperoxide (70% in cumene) were added in succession to 100 gm of triethylene glycol dimethacrylate (containing 200 ppm hydroquinone). This anaerobically hardening adhesive mixture showed the following properties:

| | | |
|---|---|---|
| Stability at 80° C.: Hand-fast after 10 minutes. | >30 | minutes |
| 500 Ncm torque: | 30 | minutes |
| Torque after 24 hours: | 46 | Nm |
| Compressive shearing strength after 24 hours: | 15 | N/mm$^2$ |

EXAMPLE 6

Two grams of cyanoacetic acid pyrrolidine, 1 gm of N,N-dimethyl-p-toluidine, and 3 gm of cumene hydroperoxide (70% in cumene) were added in succession to 100 gm of triethylene glycol dimethacrylate (containing 200 ppm hydroquinone). This anaerobically hardening adhesive mixture showed the following properties:

| | | |
|---|---|---|
| Stability at 80° C. Hand-fast after 10 minutes. | >30 | minutes |
| 500 Ncm torque: | 45 | minutes |
| Torque after 24 hours: | 40 | Nm |
| Compressive shearing strength after 24 hours: | 15 | N/mm$^2$ |

EXAMPLE 7

One gram of cyanoacetic acid morpholine, 1 gm of N,N-dimethyl-p-toluidine, and 3 gm of cumene hydroperoxide (70% in cumene) were added in succession to a mixture of 50 gm of a dimethacrylate of propoxylated diphenolol propane A and 50 gm of hydroxyethyl methacrylate. This anaerobically hardening adhesive mixture showed the following properties:

| | | |
|---|---|---|
| Stability at 80° C.: Hand-fast after 10 minutes. | >30 | minutes |
| 500 Ncm torque | 45 | minutes |
| Torque after 24 hours: | 67 | Nm |
| Compressive shearing strength after 24 hours: | 25 | N/mm$^2$ |

The preceding specific embodiments are illustrative of the practice of the invention. It is to be understood, however, that other expedients known to those skilled in the art or disclosed herein, may be employed without departing from the spirit of the invention or the scope of the appended claims.

I claim:

1. An anaerobically hardening adhesive and sealing composition comprising methacrylic or acrylic acid esters, organic peroxides, nitrogen containing compounds as accelerators for polymerization, and customary adjuvant substances, wherein from about 0.01 to 10 percent by weight, based upon the weight of the methacrylic or acrylic acid esters, of a compound selected from the group consisting of cyanoacetic acid, an ester of cyanoacetic acid where the alcohol component of the ester consists of an aliphatic or aromatic radical optionally containing electronegative substituents and having from about 1 to 20 carbon atoms, and an amide of cyanoacetic acid where the amide group consists of at least one aliphatic radical which can be interrupted by one or more hetero-atoms and/or forms a ring with the amide nitrogen, and has from about 1 to 18 carbon atoms, is also present.

2. A composition of claim 1, wherein cyanoacetic acid is present.

3. A composition of claim 1, wherein an ester of cyanoacetic acid is present where the alcohol component of the ester consists of an aliphatic or aromatic radical which can optionally contain electronegative substituents and has from about 1 to 20 carbon atoms.

4. A composition of claim 1, wherein cyanoacetic acid amide is present.

5. A composition of claim 1, wherein an amide of cyanoacetic acid is present where the amide group consists of at least one aliphatic radical which can be interrupted by one or more hetero-atoms and/or forms a ring with the amide nitrogen, and has from about 1 to 18 carbon atoms.

6. The composition of claim 5, wherein the aliphatic radical has from about 2 to 8 carbon atoms.

7. The composition of claim 5, wherein the amide has two aliphatic radicals of from about 1 to 18 carbon atoms.

8. The composition of claim 1, wherein the cyanoacetic acid or ester or amide thereof is present in an amount of from about 0.1 to 5 percent by weight.

9. The composition of claim 1, wherein an amount of organic amines is present as auxiliary accelerator.

10. The composition of claim 1, wherein the alcohol component is selected from the group consisting of methanol; butanol; cyclohexanol; decanol; or hexadecanol; unsubstituted or substituted by from 1 to 3 chlorine or bromine atoms; nitroethanol; the isomeric nitrobutenols; phenol; α-naphthol; β-naphthol; p-nitrophenol; o-chloro-p-nitrophenol; o,p-dinitrophenol; 2,4-dinitronaphthol; 4-naphthol sulfonic acid; 8-naphthol sulfonic acid; 6-naphthol β-sulfonic acid; 7-naphthol β-sulfonic acid; 8-naphthol β-sulfonic acid; and p-nitrobenzyl alcohol.

11. The composition of claim 1, wherein the amide is selected from the group consisting of cyanoacetic acid monomethylamide, cyanoacetic acid dimethylamide; cyanoacetic acid dimethylamide, cyanoacetic acid dibutylamide, cyanoacetic acid cyclohexylamide, cyanoacetic acid octylamide, cyanoacetic acid morpholite, and cyanoacetic acid pyrrolidide.

* * * * *

UNITED STATES PATENT AND TRADEMARK OFFICE
CERTIFICATE OF CORRECTION

PATENT NO. : 4,340,708
DATED : July 20, 1982
INVENTOR(S) : Werner Gruber

It is certified that error appears in the above-identified patent and that said Letters Patent is hereby corrected as shown below:

Column 3, line 19, "relative" should read -- relatively --.

Column 3, line 26, "N,N-dimethyl-o-toluidine" should read -- N,N-dimethyl-p-toluidine --.

Column 3, line 60 "polymerize" should read -- polymerize, --.

Column 5, line 26, "cumene" should read -- cumene) --.

Column 5, line 29, "[5.2.1-0$^{2.6}$]" should read -- [5.2.1.0$^{2.6}$] --.

Claim 10, lines 2 and 3, should read:

-- methanol, butanol, cyclohexanol, decanol, and hexanol, unsubstituted or substituted by from 1 to 3 --.

Signed and Sealed this

Third Day of May 1983

[SEAL]

Attest:

GERALD J. MOSSINGHOFF

Attesting Officer     Commissioner of Patents and Trademarks